(12) United States Patent
Kumar et al.

(10) Patent No.: US 8,001,486 B2
(45) Date of Patent: Aug. 16, 2011

(54) METHOD FOR VERIFICATION OF FILE-BASED MEDIA CONTENT

(75) Inventors: Shailesh Kumar, Uttar Pradesh (IN); Manik Gupta, Delhi (IN); Vivek Koul, Delhi (IN)

(73) Assignee: Interra Systems, Inc, San Jose, CA (US)

( * ) Notice: Subject to any disclaimer, the term of this patent is extended or adjusted under 35 U.S.C. 154(b) by 944 days.

(21) Appl. No.: 11/807,546

(22) Filed: May 29, 2007

(65) Prior Publication Data

US 2008/0301588 A1 Dec. 4, 2008

(51) Int. Cl.
*G06F 3/048* (2006.01)
(52) U.S. Cl. ......... 715/809; 702/108; 715/810; 715/841
(58) Field of Classification Search ................... 715/841, 715/809, 810; 702/108
See application file for complete search history.

(56) References Cited

U.S. PATENT DOCUMENTS

| | | | |
|---|---|---|---|
| 5,761,655 A * | 6/1998 | Hoffman ............................. | 1/1 |
| 6,067,639 A * | 5/2000 | Rodrigues et al. ............... | 714/38 |
| 6,393,437 B1 * | 5/2002 | Zinda et al. .................... | 717/124 |
| 6,401,220 B1 * | 6/2002 | Grey et al. ...................... | 714/33 |
| 6,460,029 B1 * | 10/2002 | Fries et al. ............................ | 1/1 |
| 6,665,634 B2 * | 12/2003 | Taft et al. ...................... | 702/186 |
| 6,698,012 B1 * | 2/2004 | Kossatchev et al. .......... | 717/126 |
| 6,895,578 B1 * | 5/2005 | Kolawa et al. ................ | 717/130 |
| 7,231,437 B2 * | 6/2007 | Boudnik et al. ............. | 709/223 |
| 7,617,462 B2 * | 11/2009 | Budzisch et al. ............. | 715/853 |
| 7,814,069 B2 * | 10/2010 | Bendapudi .................... | 707/687 |
| 2002/0143795 A1 * | 10/2002 | Fletcher et al. ............... | 707/200 |
| 2003/0009709 A1 * | 1/2003 | Belenger et al. ................ | 714/37 |
| 2004/0148572 A1 * | 7/2004 | Nakanishi et al. ............ | 715/517 |

OTHER PUBLICATIONS

"XML", taken from http://en.wikipedia.org/wiki/XML, published Feb. 27, 2004, pp. 1-15.*

* cited by examiner

*Primary Examiner* — William L Bashore
*Assistant Examiner* — Gregory A Distefano

(57) ABSTRACT

A method for automatically verifying one or more features of file-based media content (108) is disclosed. This file-based media content includes one or more media content files. The method includes customizing (204) a test plan on the basis of the one or more features. Customizing the test plan includes creating, modifying or utilizing at least one media content check of one or more media content checks. A media content check verifies at least one feature of the one or more features of the file-based media content. Further, the method includes verifying (206) the one or more features, based on the customized test plan. The method also includes documenting (208) the results obtained from the verification of the one or more features.

18 Claims, 7 Drawing Sheets

METHOD FOR VERIFICATION OF FILE-BASED MEDIA CONTENT

FIELD OF THE INVENTION

The present invention relates generally to verification of media content. More specifically, it relates to the automatic verification of file-based media content.

BACKGROUND OF THE INVENTION

Media content is used in a variety of real-world applications today. Examples of the media content can be audio and video files. There are certain features associated with the production and broadcasting of media content. These features include, but are not limited to, resolution, bit rate, frame rate, color bars, and format of the media content. Conformance to these features needs to be ensured by media content developers, providers, broadcasters and operators. Due to the use of new technologies, evolving industry standards and the use of open architecture in the development of media content, verification of the features associated with the production and broadcasting of media content is essential for quality broadcasting of media content. As a result, media content developers, providers, broadcasters and operators require quality checks to verify media content.

One of the known methods for verifying media content is manual verification of the features corresponding to each file of the media content. Manual verification requires that a person has knowledge and expertise pertaining to the features of the media content. Further, the person should be able to detect any error in the features of the media content. These errors can be non-detection of marginal quality problems, difficulty in checking the structure and encoding of media content, and non-detection of minute visual errors such as blockiness, etc. Moreover, manual verification is only useful for the verification of audio and visual features. Further, it is limited by the number of persons engaged in the verification process, since each person can check only one media file at a time.

Another known method for verifying media content is to carry out script-based quality checks. Script-based quality checks are in-house programs that perform high-level parsing of media content. These programs can verify the features of the media content by checking the headers in the media content. However, these checks are limited to specific features and do not include all the features that are required to be verified for proper broadcasting and playing of media content. Further, these script-based quality checks may not be comprehensive. In addition, it is difficult to update and modify script-based quality checks, and keep up with changing technologies and media content formats.

Based on the above, there is need for a method that will automatically verify file-based media content. The method should also be able to verify file-based media content in compliance with various formats and technology standards. Additionally, the method should be able to verify a number of media files simultaneously.

SUMMARY OF THE INVENTION

The present invention discloses a method for automatically verifying one or more features of file-based media content. File-based media content includes one or more media content files. The method includes customizing a test plan to verify at least one feature of the one or more features. Customizing the test plan includes creating, modifying or utilizing at least one media content check of one or more media content checks. A media content check is carried out to verify at least one feature of the one or more features of the file-based media content. The method includes verifying the one or more features, based on the customized test plan. Further, the method includes documenting the results obtained from the verification of the one or more features.

The present invention also discloses a menu-selection method that provides a Graphical User Interface (GUI), to display one or more media content checks. The one or more media content checks are displayed for a user to select those checks that need to be carried out to verify file-based media content. The GUI includes a main menu section that displays one or more media content checks. The GUI also includes a sub-menu section that displays options for viewing the one or more media content checks or editing parameters associated with the one or more media content checks. The GUI displays individual sections for editing the parameters associated with the one or more media content checks.

BRIEF DESCRIPTION OF THE FIGURES

The accompanying figures, where like reference numerals refer to identical or functionally similar elements throughout the separate views, and which, together with the detailed description below, are incorporated in and form part of the specification, serve to further illustrate various embodiments and explain various principles and advantages, all in accordance with the present invention.

The embodiments of the invention will hereinafter be described in conjunction with the appended drawings, provided to illustrate and not to limit the invention, wherein like designations denote like elements, and in which.

DETAILED DESCRIPTION OF THE INVENTION

Figure 1:
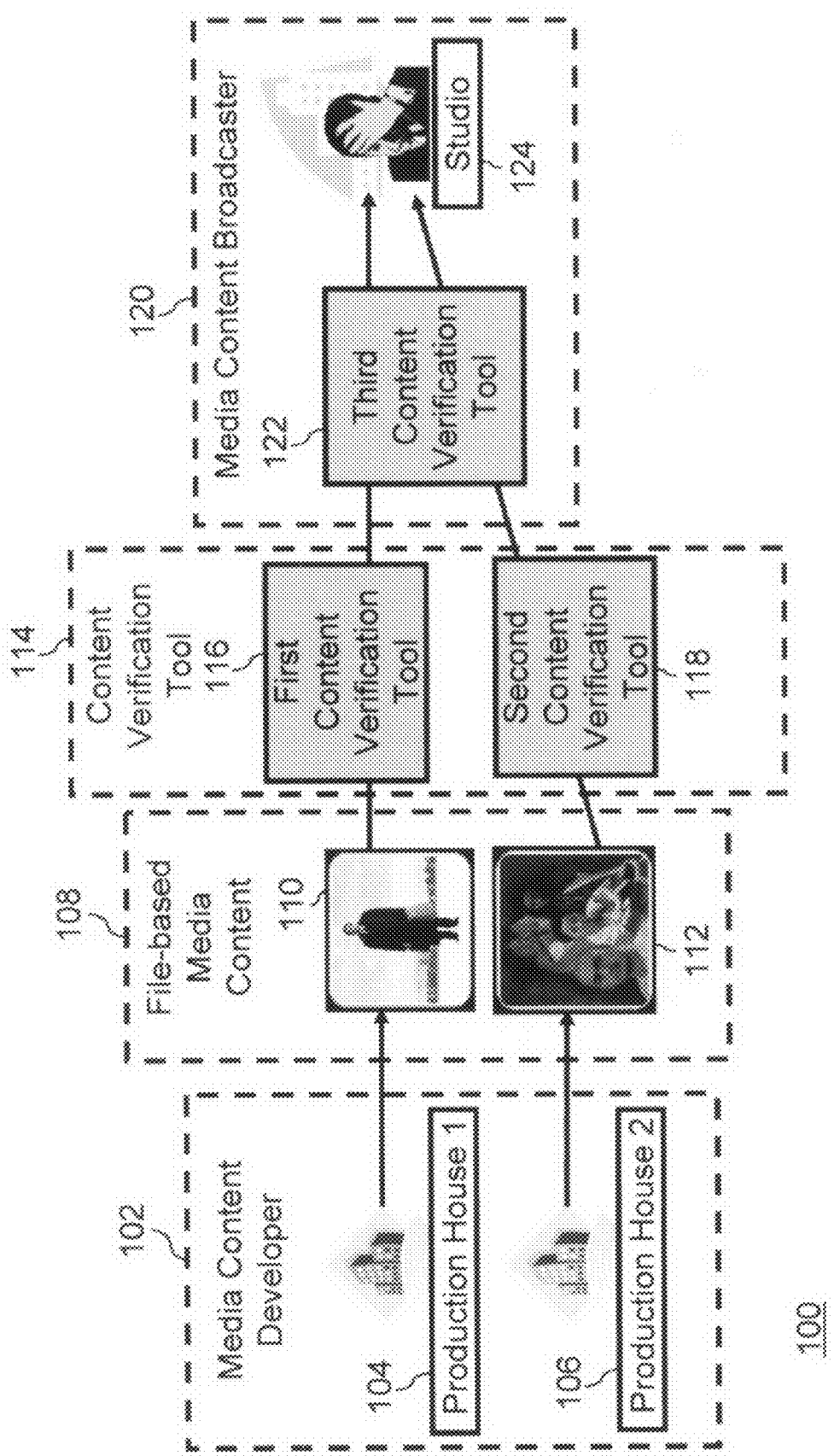
FIG. 1 is an exemplary environment where various embodiments of the invention can be practiced.

Before describing in detail the particular method for automatically verifying one or more features of file-based media content, in accordance with various embodiments of the present invention, it should be observed that the present invention utilizes a combination of method steps and apparatus components related to the method for automatically verifying one or more features of file-based media content. Accordingly, the apparatus components and method steps have been represented, where appropriate, by conventional symbols in the drawings, showing only those specific details that are pertinent for an understanding of the present invention, so as not to obscure the disclosure with details that will be readily apparent to those with ordinary skill in the art, having the benefit of the description herein.

In this document, the terms 'comprises,' 'comprising,' 'includes,' 'including,' or any other variation thereof, are intended to cover a non-exclusive inclusion, such that a process, article, system or apparatus that comprises a list of elements does not include only those elements, but may include other elements not expressly listed or inherent to such a process, article or apparatus.

The term 'another', as used in this document, is defined as at least a second or more. The term 'includes', as used herein, is defined as comprising.

FIG. 1 is an exemplary environment where various embodiments of the invention can be practiced. The environment 100 includes a media content developer 102, a file-based media content 108, a content verification tool 114, and a media content broadcaster 120. Examples of the media content developer 102 include, but are not limited to, a production house, a film studio, and an audio and video recording studio. In an embodiment of the present invention, the media content developer 102 includes a first production house 104 and a second production house 106. The first production house 104 and the second production house 106 are shown for exemplary purposes only. However, it will be apparent to a person with ordinary skill in the art that the media content developer 102 can include one or more production houses.

The media content developer 102 produces the file-based media content 108. Examples of the file-based media content 108 can be an audio file, a video file, a compressed media file, and an image file. The file-based media content 108 includes a first media content file 110 and a second media content file 112, which are represented in the file-based media content 108, only for the purpose of description. In the present embodiment, the first media content file 110 is produced by the first production house 104 and the second media content file 112 by the second production house 106.

The file-based media content 108 is required to be verified to eliminate errors, ensuring quality and conformance with technology standards. Examples of the technology standards include, but are not limited to, H.264, MPEG-2, CIF and the like. The content verification tool 114 verifies the file-based media content 108 by using a test plan. Therefore, it will be apparent to a person of ordinary skill in the art that the test plan is a part of the content verification tool 114, and can be customized to verify one or more features of the file-based media content. The test plan can also be customized for new formats, technology standards and studio workflow requirements. The content verification tool 114 includes a first content verification tool 116 and a second content verification tool 118. In an embodiment of the present invention, the one or more features of the first media content file 110 are verified by the first content verification tool 116, and the one or more features of the second media content file 112 are verified by the second content verification tool 118. It will be apparent to a person with ordinary skill in the art that the first content verification tool 116 and the second content verification tool 118 can be structurally and functionally similar. It will be also apparent to a person skilled in the art that the first media content file 110 and the second media content file 112 can be verified by a single content verification tool.

The file-based media content 108 is sent to the media content broadcaster 120 after being verified by the content verification tool 114. Examples of the media content broadcaster 120 can include, but are not limited to, a media studio, a cable-branded channel, a satellite channel, an Internet Protocol Television (IPTV), and a Direct-to-Home (DTH) broadcaster. The file-based media content 108 is broadcast by the media content broadcaster 120, which includes a studio 124 for broadcasting the file-based media content 108 to target users. Before being broadcast, the file-based media content goes through various stages in the workflow at the studio 124. These stages include the processes of capturing, editing, post-production procedures, format conversion, storage, transmission and delivery. In an embodiment of the invention, the verified file-based media content 108 received by the media content broadcaster 120 is verified again to ensure its conformance to studio workflow requirements. In this embodiment, the media content broadcaster 120 includes a third content verification tool 122 for the verification of the file-based media content 108. If more than one tool is used in the workflow stages, specific standards are defined for media formats, to ensure that the tools used can interoperate effectively. Additionally, conformance to the interoperability parameters is ensured by adding media content checks in the content verification tool 114. For example, a video teleconferencing broadcast at 384 Kbps (Kilobits per second) is required to ensure a Common Intermediate Format (CIF) resolution of 352×288, an aspect ratio of 11:9, video encoding at 320 Kbps, and audio encoding at 48 Kbps. In an example of this embodiment, the third content verification tool 122 is customized to check for the workflow requirements, interoperability parameters and playout needs of the studio 124.

It will be apparent to a person with ordinary skill in the art that the content verification tools 116, 118 and 122 can be structurally and functionally similar. It will also be apparent to the person that the content verification tools 116, 118 and 122 can be customized for a particular use by customizing the test plans.

Figure 2:
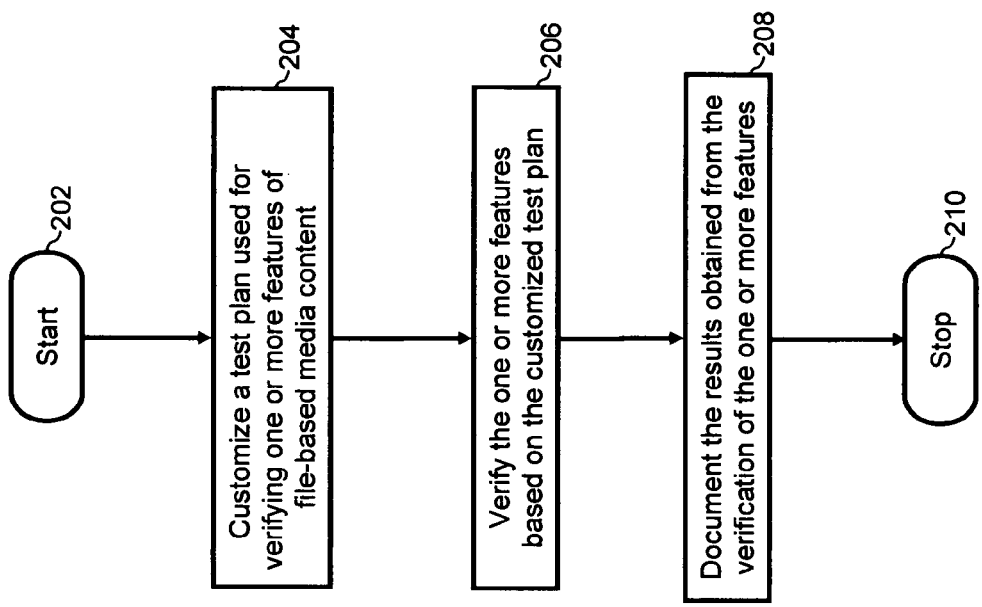
FIG. 2 is a flowchart depicting a method for automatically verifying one or more features of file-based media content, in accordance with an embodiment of the invention.

FIG. 2 is a flowchart depicting a method for automatically verifying the one or more features of the file-based media content 108, in accordance with an embodiment of the invention. The method for automatically verifying the one or more features of the file-based media content 108 is initiated at step 202. At step 204, a test plan is customized to verify the one or more features of the file-based media content 108. The content verification tool 114 uses the test plan to verify the one or more features of the file-based media content 108. Examples of these one or more features include, but are not limited to, format, resolution, bit rate, technology standard, media content quality, color bar, caption, audio level, blockiness, freeze frame, special content inserts, sub-titles, language, copyright information, artifacts, blank frame, silence beyond threshold, frame rate, and encoding parameters. In accordance with an embodiment of the invention, the test plan is customized by utilizing, modifying or creating at least one media content check of one or more media content checks, to verify the one or more features. Each media content check of one or more media content checks verifies at least one feature of the one or more features.

At step 206, the one or more features of the file-based media content 108 are verified, based on the customized test plan. For example, the first content verification tool 116 verifies the first media content file 110, based on the customized test plan, to verify the one or more features of the first media content file 110.

At step 208, the results obtained from the verification of the one or more features are documented. In an example, documentation includes writing and displaying the results. These results can include a summary of the errors detected in the file-based media content 108. The results can also include a display of one or more flames, where at least one frame of the one or more frames may contain an error. A value log corresponding to at least one feature selected by a user can also be included in the results. A user can be a person using the content verification tool 114 for verifying the file-based media content 108. Moreover, the results can include detailed technical information corresponding to one or more errors in the file-based media content 108. For example, the results obtained from the verification of a video file with an H.264 format can be documented. The documented results can include a summary of the errors in the video file, a display of the frames in the video file that have errors, technical information pertaining to errors in the video file, and a comprehensive summary of the errors. The documented results can also be displayed to the user.

At step 210, the method for automatically verifying one or more features of the file-based media content 108 is terminated.

Figure 3:
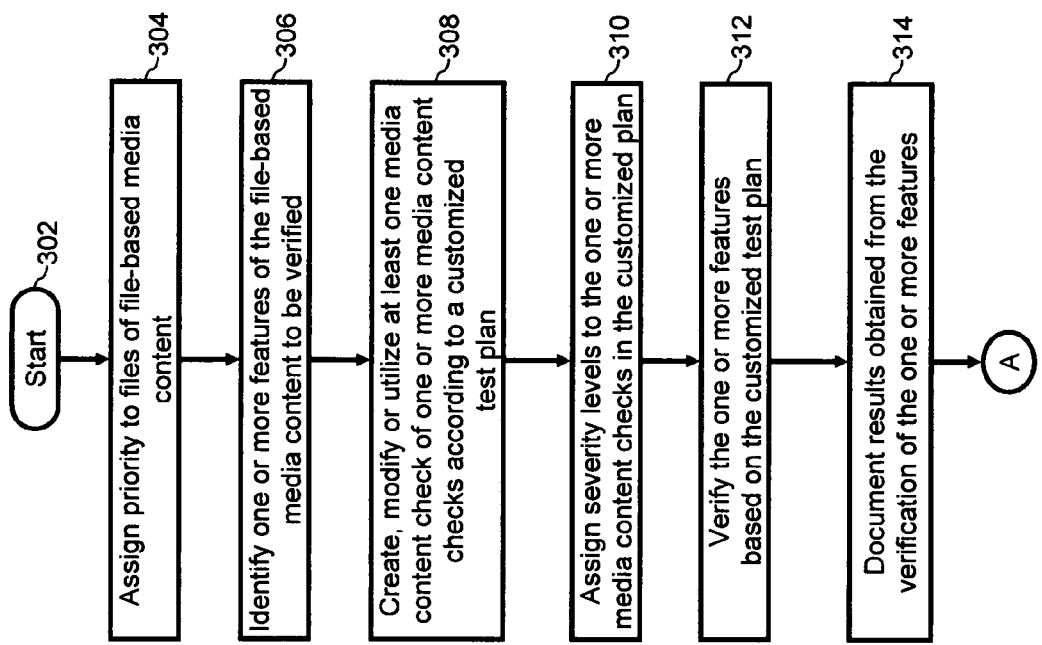
FIGS. 3 and 4 illustrate a flowchart depicting a method for automatically verifying one or more features of file-based media content, in accordance with another embodiment of the invention.
Figure 4:
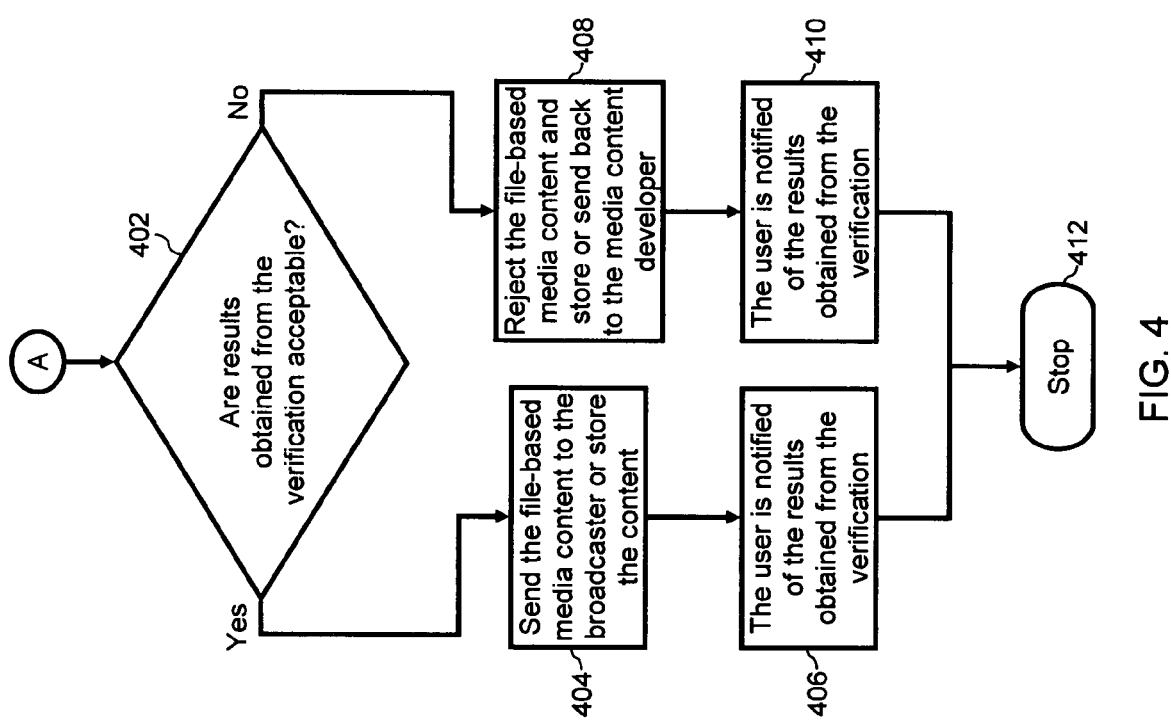

FIGS. 3 and 4 illustrate a flowchart depicting a method for automatically verifying one or more features of the file-based media content 108, in accordance with another embodiment of the invention. The method for automatically verifying one or more features of the file-based media content 108 is initiated at step 302.

At step 304, priority is assigned to each media content file of the file-based media content 108. For example, the first media content file 110 of the file-based media content 108 can be assigned a 'high' priority and the second media content file 112 of the file-based media content 108 can be assigned a 'low' priority. On the basis of the assigned priority, media content files with a 'high' priority can be verified before 'normal' and 'low' priority files. Similarly, a media content file with a 'normal' priority can be verified before a media content file with a 'low' priority.

At step 306, one or more features of the file-based media content 108 to be verified are identified by a user on the basis of the requirements related to verification, and the format and technology standards of the file-based media content 108. The one or more features can also be identified on the basis of the workflow requirements of the studio 124. For example, there can be a requirement to verify features such as blockiness, artifacts and silence detection. For example, if the file-based media content 108 is a video file with an H.264 format that has a video bit rate of 2 Mbps (Megabits per second), a feature that can be identified to verify the video file of the H.264 format is a video bit rate. As another example, if the file-based media content 108 is a D-10 MPEG-2 video file, the feature identified for verification is that the chroma format should be 4:2:2.

At step 308, a test plan is customized, based on the one or more features of the file-based media content 108. The process of customizing the test plan is carried out by utilizing, modifying or creating one or more media content checks, where each media content check verifies at least one feature of the one or more features. A media content check verifies a feature, based on a set of restrictions on a value corresponding to the feature. According to the test plan, a feature is verified based on the existing value of the feature. For example, the value of the feature "resolution" can be 640×480 or can be 1024×768. In another example, the value of the feature "bit rate" can be 2 Mbps or 128 Kbps. These restrictions are defined, based on the format of the media content and the feature being verified by the media content check. A restriction can be the type of data, format of data, restricted data range and permitted data range of the value corresponding to a feature. For example, if the file-based media content 108 is a video file with Internet Streaming Media Alliance (ISMA) 2.0 Profile 2, restrictions pertaining to a media content check, to verify the format and resolution of the video file, could be that the video has a H.264 format and a resolution of 352× 288.

The one or more media content checks are defined in a markup language-based registration framework. This registration framework is software that is a part of the content verification tool 114. Examples of a markup language include, but are not limited to, Extensible Markup Language (XML), Hypertext Markup Language (HTML) and Extensible Hyper Text Markup Language (XHTML). For example, a media content check can be defined in the markup language-based registration framework to verify a feature. In an embodiment, a user utilizes the media content check to verify the feature. For example, if a media content check, to verify the bit rate of a video file with an H.264 format, is defined in the markup language-based registration framework, this media content check can be utilized in a test plan to verify the bit rate of the video file with the H.264 format. In another embodiment, if a media content check is not defined for a feature, it is created by a user. A media content check is created by adding directives to the markup language-based registration framework. The process of adding directives includes listing the media content check and adding the methodology for implementation of the created media content check. For example, a media content check can be created in the markup language-based registration framework to verify the video bit rate of a media content file with an MPEG-4 format. In yet another embodiment, if a media content check is already defined in the markup language-based registration framework, it can be modified to change a restriction on a value associated with the media content check. For example, if a media content check is defined to verify that the video bit rate of a video file with an H.264 format is equal to 2 Mbps, it can be modified to verify that the video bit rate is equal to 2.5 Mbps. This can be performed by modifying the directives in the markup language-based registration framework. In an embodiment, the test plan can be customized further on the basis of the requirements of the studio 124.

At step 310, severity levels can be assigned to the one or more media content checks of the customized test plan, on the basis of the required accuracy of the feature being verified by the one or more media content checks. For example, the first media content file 110 is verified to check two features, its resolution and bit rate. If the resolution is required to be accurate, a media content check, to verify the resolution feature, can be assigned a 'fatal' severity level. In this event, if the resolution is found to differ from the required value, the first media content file 110 is considered to be unsuitable for broadcasting. For features that are considered to be suitable, without being completely accurate, a media content check can be assigned a 'warning' severity level.

At step 312, the one or more features of the file-based media content 108 are verified on the basis of the customized test plan. The one or more media content checks utilize the defined set of restrictions to verify the one or more features. A media content check can evaluate a value corresponding to a feature of the one or more features. The one or more features can be verified on the basis of the value of the features with respect to the set of restrictions. For example, two features, the resolution and bit rate, can be verified by one or more media content checks. The one or more media content checks can check the value of the two features with a set of restrictions. For example, the one or more media content checks verify the first media content file 110 by checking that the resolution is 800×600 and the bit rate is in the range of 1800 Kbps-2400 Kbps.

At step 314, the results obtained from the verification of the one or more features are documented. These results include a summary of the errors in the file-based media content 108. In an embodiment, documentation includes writing and displaying the results. In one example, the results also include a display of one or more frames, where at least one frame of the one or more frames contains an error. In another example, the results also include a value log that corresponds to at least one feature selected by a user. Further, the results can include detailed technical information pertaining to one or more errors present in the file-based media content 108. For example, if the first media content file 110 contains a frame with a resolution of 798×602, the media content checks corresponding to the resolution feature will document the error location and type of error. In addition, the results can display thumbnails of frames; the thumbnails displayed can include one or more frames with errors and other frames in the vicinity of the frame having errors. Moreover, the results can also include the severity level of the error, a short synopsis of the error, and the configuration of the test plan applied for the process of verification.

At step 402, it is determined whether the results obtained from the verification are acceptable. The file-based media content 108 can be accepted on the basis of the number of errors present and the severity level of each error. For example, if no error is found after the verification of the first media content file 110, the results are acceptable. In another example, the first media content file 110 may be considered suitable for broadcasting if an error is found in a feature that has been assigned a 'warning' severity level.

At step 404, the file-based media content 108 is sent to the media broadcaster 120 when the results obtained from the verification of the file-based media content 108 are found to be acceptable. In another embodiment of the invention, the file-based media content 108 is stored at a location, ready to be broadcast.

At step 406, the user is notified of the results obtained from the verification of the file-based media content 108. Notification can be by emails, visual alarms, audio alarms, and mobile alerts. For example, if the first media content file 110 contains no errors, a user can be notified by displaying a green light. This green light indicates that the file has been accepted, and can be provided to the media broadcaster 120. In another example, the user is notified by displaying an orange light if the first media content file 110 contains one or more errors of a 'warning' severity level.

At step 408, the file-based media content 108 is rejected if the file-based media content 108 is not acceptable on the basis of the results obtained from the verification. In an embodiment of the invention, the rejected file-based media content can be stored at a location in a server for future use. In another embodiment, the rejected file-based media content 108 can be sent back to the media content developer 102. For example, the first media content file 110 can be rejected if there is found to be an error in a feature that has been assigned a 'fatal' severity level.

At step 410, the user is notified of the results obtained from the verification of the file-based media content 108. In this case, since the first media content file 110 has been verified and found to contain errors in features that have been assigned 'fatal' severity level, users can be notified through a red light display. This red light display informs them that the first media content file 110 has been rejected and cannot be passed to the media broadcaster 120.

At step 412, after performing any one of the step 406 and step 410, the method for automatically verifying one or more features of the file-based media content 108 is terminated.

In another embodiment of the invention, the one or more media content checks are grouped in one or more schemas. Each schema of the one or more schemas contains one or more media content checks. For example, a video schema can include media content checks corresponding to video format such as the frame rate, the peak bit rate, the chroma format and the video format. Similarly, a system schema can include media content checks corresponding to the system format, such as the length of the media content file and the number of tracks.

In another embodiment of the invention, the one or more schemas can be grouped to form a configuration. This configuration can be designed for a particular media content file format. For example, a configuration can be designed for an MPEG-2 format video file, which can contain different schemas, where each schema can include a set of media content checks, for example, an audio schema, a video schema and a system schema.

Figure 5:
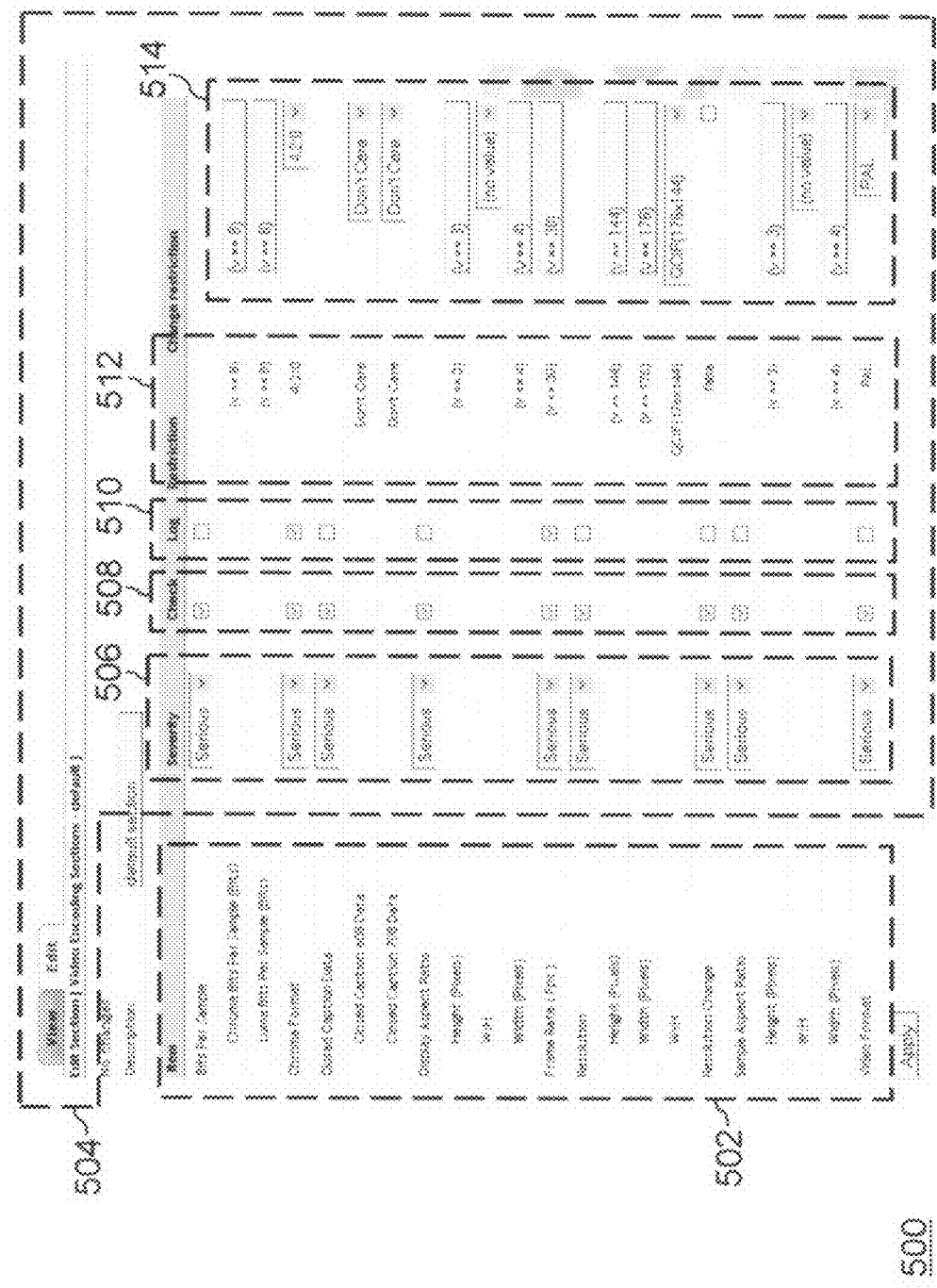
FIG. 5 is a schematic view of a Graphical User Interface (GUI) displaying a menu for a user to select and update parameters related to one or more media content checks.

FIG. 5 is a schematic view of a Graphical User Interface (GUI) displaying a menu for a user to select and update parameters related to one or more media content checks. The GUI 500 includes a main menu section 502 and a sub-menu section 504. The main menu section 502 displays the one or more media content checks. For example, the media content checks corresponding to the features bits per sample, chroma format, closed caption data, display aspect ratio, frame rate, resolution and video format are displayed as shown in FIG. 5. The one or more media content checks are displayed, based on the methodology defined in a markup language-based registration framework. The sub-menu section 504 provides an option to at least view the one or more media content checks, and select at least one media content check to be used by the content verification tool 114 to verify the file-based media content 108. The sub-menu section 504 also provides options for editing parameters associated with the at least one media content check. The sub-menu section 504 includes a severity level section 506, a check section 508, a log section 510, a restriction section 512, and a change restriction section 514. The user can edit the parameters by selecting values from drop-down lists or edit the values in the sub-menu sections. For example, the parameters associated with the media content check for the frame rate feature of the file-based media content 108 include the severity level, the check value of the frame rate, the log value of the frame rate, and the restriction value of the frame rate.

A severity level can be selected in the severity level section 506 for each media content check displayed in the main menu section 502. The severity level section 506 displays a drop-down list corresponding to each media content check in the main menu section 502. The user can then select a severity level from the 'fatal', 'serious' and 'warning' levels pertaining to each media content check. For example, the media content check for the frame rate feature of the file-based media content 108 is assigned a 'serious' severity level. The check section 508 displays a check box corresponding to each media content check in the main menu section 502. The user can select a media content check to verify a feature of the file-based media content 108. The log section 510 displays a check box corresponding to each media content check in the main menu section 502. The user can choose to create a log table to verify a particular feature. This selection results in a log file that contains the values of the feature at different time instances during the verification process of the file-based media content 108.

The restriction section 512 displays the restriction value corresponding to each media content check in the main menu section 502. The restriction values are displayed as defined in the markup language-based registration framework. The user can edit the restrictions shown by changing their value, which corresponds to the restriction in the change restriction section 514. As shown in FIG. 5, the user has provided a value of 30 in the change restriction section 514 for the media content check corresponding to the frame rate. The content verification tool 114 verifies the file-based media content 108, based on the media content checks selected in the check section 508 and the associated parameters. Eventually, the GUI 500 is updated, based on the selected media content checks and the edited parameters.

In an embodiment of the invention, the GUI 500 is displayed, based on a methodology defined in a markup language-based registration framework. The methodology includes the directives and restriction values of the media content checks. Therefore, any change in the directives in the markup language-based registration framework is reflected in the GUI 500. The markup language-based registration framework can be based on an Extensible Markup Language (XML). In an embodiment, the GUI 500 provides a section (not shown in FIG. 5) for creating a media content check. The media content check is created by adding directives to the markup language-based registration framework. This includes listing the media content check and adding the methodology for the implementation of the created media content check. The created media content check is added to the display in the main menu section 502, and the parameters associated with the created media content check are displayed in the sub-menu section 504. For example, a media content check corresponding to the feature "bit rate" can be created by adding directives to the markup language-based registration framework. The directives include specification of parameters associated with the media content check corresponding to the "bit rate" feature. The display of the GUI 500 is updated with the addition of the media content check corresponding to the feature "bit rate" along with the associated parameters.

Figure 6:
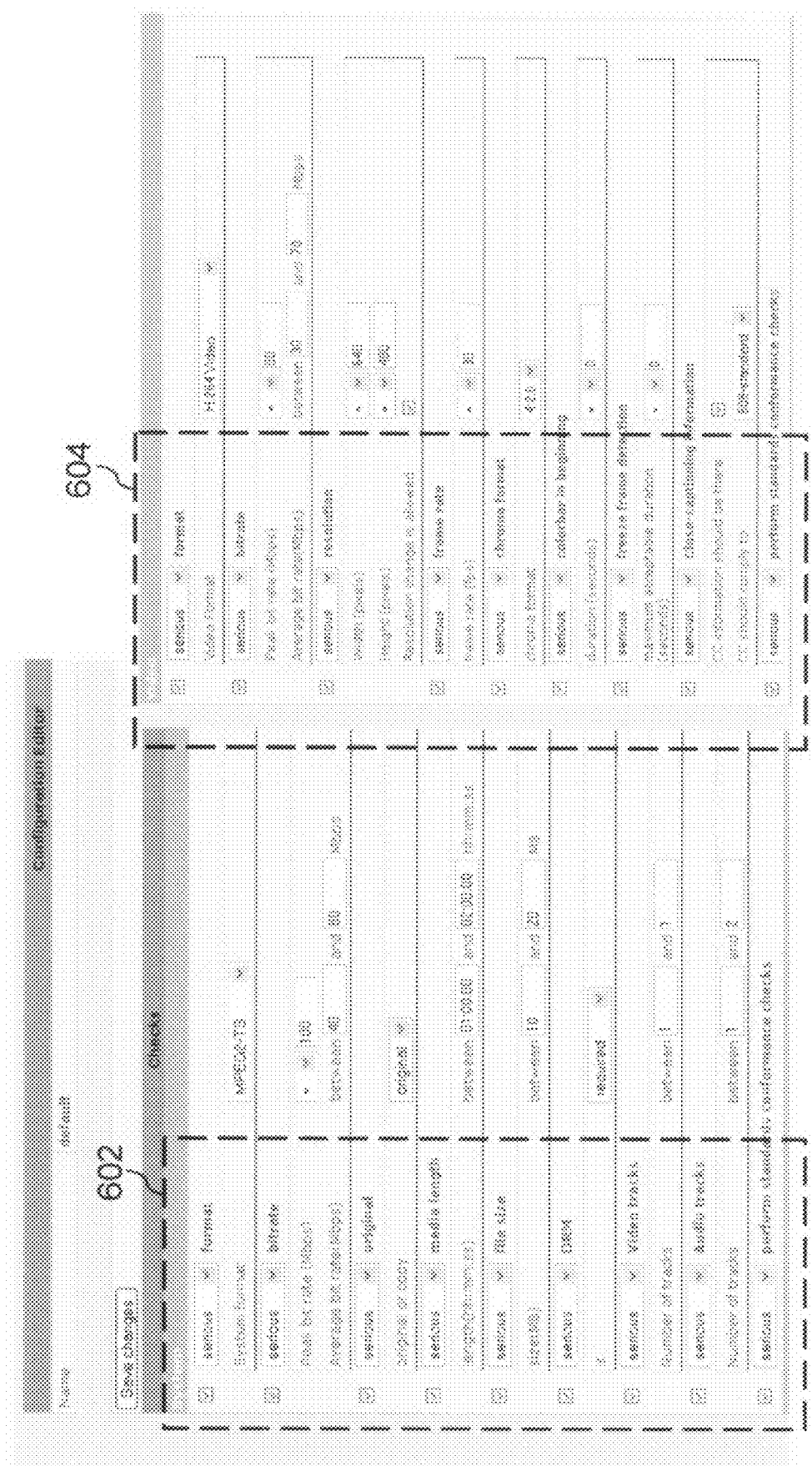
FIG. 6 is a schematic view of a GUI, showing the grouping of one or more media content checks into schemas.

FIG. 6 is a schematic view of the Graphical User Interface (GUI) 600, showing the grouping of one or more media content checks into schemas. The GUI 600.displays a system schema 602 and a video schema 604. A schema is a grouping of one or more media content checks. In an embodiment of the invention, this grouping is performed to facilitate the customization of test plans to verify one or more media content files. The system schema 602 displays a list of media content checks corresponding to the system-related features of the file-based media content 108. As shown in the FIG. 6, the system schema 602 displays media content checks corresponding to the system format, the bit rate, the original or copy file, the media content file length, the file size, the digital rights management (DRM), the number of video tracks, the number of audio tracks, and the standard conformance. Similarly, the video schema 604 displays a list of media content checks corresponding to the video related features of the file-based media content 108. As shown in the FIG. 6, the video schema 604 displays media content checks corresponding to the video format, the bit rate, the resolution, the frame rate, the chroma format, the color bar at the beginning, freeze frame detection, close-captioning information, and standard conformance.

Figure 7:
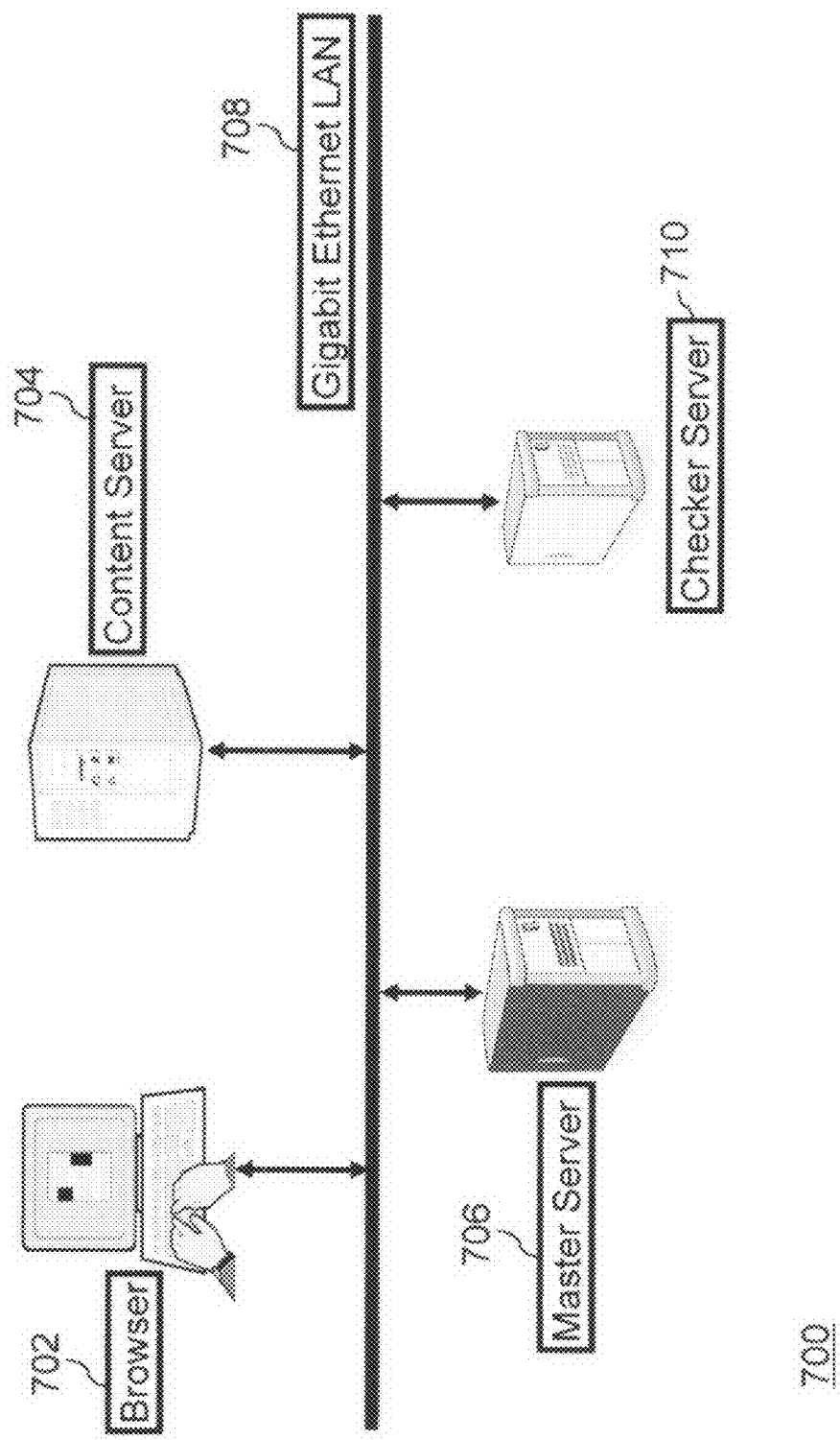
FIG. 7 is a schematic block diagram representing the physical arrangement of a media content verification tool.

FIG. 7 is a schematic block diagram representing the physical arrangement 700 of the media content verification tool 114 for the configuration of customized test plans to verify one or more media content files, in accordance with an embodiment of the present invention. The physical arrangement 700 includes a browser 702, a content server 704, a master server 706, a checker server 710, and a Gigabit Ethernet LAN 708. In an embodiment, the browser 702 enables the user to view and edit the customized test plans for each media content file from a batch of media content files. The browser 702 also provides an option to a user to select one or more media content files. The user stores one or more media content files in the content server 704. With the help of the browser 702, the user creates one or more customized test plans on the master server 706, to verify the one or more media content files. The master server 706 controls the checker server 710. In particular, the master server 706 assigns verification tasks to the checker server 710, corresponding to the one or more customized test plans. The checker server 710 executes the verification tasks, based on the results obtained from the verification, relating to customized test plans and documents. These results are displayed on the browser 702 It will be apparent to a person with ordinary skill in the art that more than one content server or more than one checker server can be used to verify the one or more media content files.

In accordance with another embodiment of the invention, the content verification tool 114 can be configured remotely from any server in the Gigabit Ethernet LAN 708 by using the browser. 702. This enables a user to schedule verification tasks for the content verification tool 114 from any server/PC/laptop on the Gigabit Ethernet LAN 708. Therefore, verification of the file-based media content 108 can be performed in the background mode with remote configuration and scheduling.

Various embodiments, as discussed above, provide a method for automatically verifying one or more features of file-based media content. The user can create customized test plans for the verification of file-based media content. Therefore, the file-based media content can be automatically verified, based on the customized test plans created by the user. The user can create one or more media content checks for a specific format or technology standard of a media content file, and can also modify a media content check according to verification requirements. Further, the method can be simultaneously applied to a plurality of media files. The method enables a user to increase the number of checker servers and/or content servers, according to a user's requirement, to verify a large number of media files simultaneously. This method can be applied at media content production houses as well as by media content broadcasters. In another embodiment of the invention, a user can also create a customized test plan for the verification of media content files, based on the requirements of a media content broadcaster such as a studio.

The method for verification of file-based media content, as described in the present invention, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and the Internet. The computer comprises a microprocessor, which is connected to a communication bus. The computer also includes a memory, which may include Random Access Memory (RAM) and Read Only Memory (ROM). The computer system further comprises a storage device, which can be a hard disk drive or a removable storage drive such as a floppy disk drive, optical disk drive and the like. The storage device can also be other similar means for loading computer programs or other instructions into the computer system.

The computer system executes a set of instructions that are stored in one or more storage elements, in order to process input data. The storage elements may also hold data or other information as desired. The storage element may be in the form of an information source or a physical memory element present in the processing machine. Exemplary storage elements include hard disk, DRAM, SRAM and EPROM. The storage element may also be external to the computer system, and connected to or inserted into the computer for download at or prior to the time of use. Exemplary of such external computer program products are computer readable storage mediums such as CD-ROMS, Flash chips, floppy disks, and the like.

The set of instructions may include various commands that instruct the processing machine to perform specific tasks such as the steps that constitute the method of the present invention. The set of instructions may be in the form of a software program. The software may be in various forms such as system software or application software. Further, the software might be in the form of a collection of separate programs, a program module with a larger program or a portion of a program module. The software might also include modular programming in the form of object-oriented programming. The software program containing the set of instructions can be embedded in a computer program product for use with a computer, the computer program product comprising a computer usable medium having a computer readable program code embodied therein. The processing of input data by the processing machine may be in response to user commands, or in response to results of previous processing or in response to a request made by another processing machine.

The modules described herein may include processors and program instructions to implement the functions of the modules described herein. Some or all functions could be implemented by a state machine that has no stored program instructions, or in one or more application specific integrated circuits (ASICs), in which each function or some combinations of certain of the functions are implemented as custom logic.

In the foregoing specification, the invention and its benefits and advantages have been described with reference to specific embodiments. However, one with ordinary skill in the art would appreciate that various modifications and changes can be made, without departing from the scope of the present invention, as set forth in the claims. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage or solution to occur or become more pronounced are not to be construed as critical, required or essential features or elements of any or all the claims. The invention is defined solely by the appended claims, including any amendments made during the pendency of this application and all equivalents of those claims, as issued.

What is claimed is:

1. A method for performing a quality check of file-based media content, the quality check being performed by automatically verifying one or more features of the file-based media content, the file-based media content comprising one or more media content files, the method comprising:
   customizing a test plan for verifying the one or more features for the quality check, wherein customizing comprises at least one of creating, modifying and utilizing at least one media content check of one or more media content checks, wherein a media content check is applied to check at least one feature of the one or more features of the file-based media content associated with a corresponding media content file, the media content check being a defined set of restrictions, the corresponding media content files being at least one of an audio file, a video file, and an image file, the media content file comprising one or more existing values of the one or more features;
   verifying the one or more features based on the customized test plan, wherein the verification of the at least one feature comprises checking an existing value corresponding to the at least one feature of the corresponding media content file against the defined set of restrictions; and
   documenting results obtained from the verification of the one or more features.

2. The method according to claim 1, wherein creating the at least one media content check comprises adding directives to a markup language-based registration framework corresponding to the at least one media content check.

3. The method according to claim 2, wherein adding directives to the markup language-based registration framework comprises:
   listing the at least one media content check in the markup language-based registration framework; and
   adding a methodology for implementation of the at least one media content check in the markup language-based registration framework.

4. The method according to claim 2, wherein the markup language-based registration framework is based on an Extensible Markup Language (XML).

5. The method according to claim 1, wherein modifying the at least one media content check comprises editing a markup language-based registration framework corresponding to the at least one media content check.

6. The method according to claim 1, wherein the step of customizing the test plan further comprises grouping the one or more media content checks into one or more schemas, wherein each schema includes a set of media content checks.

7. The method according to claim 1, wherein the step of customizing the test plan further comprises assigning severity levels to the at least one media content check of the one or more media content checks.

8. The method according to claim 1, wherein the step of customizing the test plan further comprises assigning a priority level to at least one media content file of the one or more media content files.

9. The method according to claim 1, wherein the step of verifying the one or more features comprises using the customized test plan in background mode with remote configuration and scheduling.

10. The method according to claim 1, wherein the defined set of restrictions include at least one of type of data, format of data, restricted data range and permitted data range of the value corresponding to the one or more features.

11. The method according to claim 1 further comprising rejecting a media content file of the one or more media content files based on the results obtained from the verification of the one or more features.

12. The method according to claim 1, wherein the step of documenting the results comprises notifying a user of results obtained from the verification of the one or more features, wherein notifying comprises at least one of e-mailing the results to the user; generating visual alarm, generating audio alarm and sending a mobile alert to the user.

13. The method according to claim 1, further comprising detecting and documenting interoperability errors in the file-based media content.

14. The method according to claim 1, wherein documenting the results comprises displaying one or more errors associated with the corresponding media content file.

15. A computer program product for use with a computer, the computer program product comprising a computer readable storage medium having a computer readable program code embodied therein for performing a quality check of file-based media content, the quality check being performed by automatically verifying one or more features of the file-based media content, the file-based media content comprising one or more media content files, the computer program code performing:
- customizing a test plan based on the one or more features for the quality check, wherein customizing comprises at least one of creating, modifying and utilizing at least one media content check of one or more media content checks, wherein a media content check is applied to check at least one feature of the one or more features of the file-based media content associated with a corresponding media content file, the media content check being a defined set of restrictions, the corresponding media content files being at least one of an audio file, a video file, and an image file, the media content file comprising one or more existing values of the one or more features;
- verifying the one or more features based on the customized test plan, wherein the verification of the at least one feature comprises checking an existing value corresponding to the at least one feature of the corresponding media content file against the defined set of restrictions; and
- documenting results obtained from the verification of the one or more features.

16. The computer program product of claim 15, wherein the computer program code performing the step of customizing the test plan comprises a computer program code performing:
- grouping the one or more media content checks into one or more schemas, wherein each schema includes a set of media content checks; and
- assigning severity levels to the at least one media content check of the one or more media content checks.

17. The computer program product of claim 15, wherein the computer program code performing the step of documenting the results comprises a computer program code performing at least one of e-mailing the results to a user, generating visual alarm, generating audio alarm and sending mobile alerts to the user.

18. The computer program product of claim 15, wherein the computer program code performing the step of documenting the results comprises a computer program code for displaying one or more errors associated with the corresponding media content file.

* * * * *